United States Patent
Alameh et al.

(10) Patent No.: US 8,228,031 B2
(45) Date of Patent: Jul. 24, 2012

(54) APPARATUS FOR CHARGING A PORTABLE ELECTRONIC DEVICE USING A ROTATABLE TURBINE

(75) Inventors: Rachid Alameh, Crystal Lake, IL (US);
Greg Black, Vernon Hills, IL (US);
Mark Lemke, Mundelein, IL (US);
Martin Pais, North Barrington, IL (US);
Hugh Smith, Palatine, IL (US)

(73) Assignee: Motorola Mobility, inc., Libertyville, IL (US)

( * ) Notice: Subject to any disclaimer, the term of this patent is extended or adjusted under 35 U.S.C. 154(b) by 501 days.

(21) Appl. No.: 12/196,655

(22) Filed: Aug. 22, 2008

(65) Prior Publication Data
US 2010/0045233 A1    Feb. 25, 2010

(51) Int. Cl.
*H02J 7/00*    (2006.01)
(52) U.S. Cl. ........................................ 320/115
(58) Field of Classification Search ............... 320/115; 290/43
See application file for complete search history.

(56) References Cited

U.S. PATENT DOCUMENTS

| | | | |
|---|---|---|---|
| 4,746,808 A | | 5/1988 | Kaeser |
| 4,787,751 A | * | 11/1988 | Bakels ............ 366/110 |
| 5,152,661 A | * | 10/1992 | Sheets ............ 415/84 |
| 5,440,176 A | * | 8/1995 | Haining ............ 290/54 |
| 6,239,501 B1 | | 5/2001 | Komarechka |
| 6,293,771 B1 | | 9/2001 | Haney et al. |
| 6,525,996 B1 | * | 2/2003 | Miyazawa ............ 368/204 |
| 6,897,575 B1 | | 5/2005 | Yu |
| 7,205,732 B1 | | 4/2007 | Gold |
| 7,233,078 B2 | | 6/2007 | Baarman et al. |
| 2005/0161949 A1 | * | 7/2005 | Baarman et al. ......... 290/43 |
| 2007/0014659 A1 | * | 1/2007 | Dodds ............ 415/80 |
| 2007/0024233 A1 | * | 2/2007 | Ekchian et al. ......... 320/101 |
| 2008/0143109 A1 | * | 6/2008 | Pitchford et al. ......... 290/43 |
| 2008/0272733 A1 | * | 11/2008 | Huang ............ 320/102 |

FOREIGN PATENT DOCUMENTS

| | | |
|---|---|---|
| KR | 1020060025334 A | 3/2006 |
| KR | 100732555 B1 | 6/2007 |

OTHER PUBLICATIONS

21 Quest; Ceiling Fan Battery Charger (revised addition); May 20, 2006.
Charlie White; Tent-Mounted Wind Charger Powers Up that Cellphone in the Wilderness; http://gizmodo.com/gadgets/wind-power/tent+mounted-wind-charger-powers-up-that-cellphone; Aug. 22, 2008.
Glastonbury; Orange Wind Charger; http://www.orange.co.uk/glastonbury/1783.htm?linkfrom=glastonbury; Aug. 21, 2008.

* cited by examiner

*Primary Examiner* — Arun Williams (57) ABSTRACT

An apparatus (100) that charges a portable electronic device is disclosed. The apparatus can include a portable electronic device housing (110) including a first aperture (111) and at least one second aperture (112). The apparatus can include a battery (120) coupled to the portable electronic device housing and a generator (130) coupled to the battery, where the generator can be configured to charge the battery. The apparatus can include a rotatable turbine (140) enclosed within the portable electronic device housing and coupled to the generator, where the rotatable turbine can be configured to drive the generator. The apparatus can include a conduit (150) coupled to the rotatable turbine and coupled to the first aperture, where the conduit can be configured to provide fluid flow to drive the rotatable turbine.

20 Claims, 9 Drawing Sheets

APPARATUS FOR CHARGING A PORTABLE ELECTRONIC DEVICE USING A ROTATABLE TURBINE

BACKGROUND

1. Field

The present disclosure is directed to an apparatus for charging a portable electronic device. More particularly, the present disclosure is directed to charging a portable electronic device using an integrated turbine and generator.

2. Introduction

Presently, portable electronic devices, such as music players, cellular phones, personal digital assistants, laptop computers, handheld electronic devices, and other portable electronic devices provide easily transportable applications. The mobility of these devices requires the use of a battery to power the devices. Higher battery capacity is needed to support ever increasing portable electronic device features, computation, and capabilities. A higher capacity battery requires quicker charging rates to charge the battery. Unfortunately, fast charging rates result in high device component temperatures that can damage the device components and other device elements and the high temperatures can annoy or even burn a user of a portable electronic device. The high charging rate requires large exposed contact areas to support the high current and heat dissipation. Unfortunately, large contact areas are not conducive to the portability of electronic devices and can result in safety issues, such as unintended shorts.

Furthermore, use of a portable electronic device obviously drains the portable electronic device battery, which requires regular charging of the battery, typically from an electrical outlet. Unfortunately, because of the portability of such electronic devices, an electrical outlet may not always be available to charge the device when the battery charge is depleted. Alternate sources could be useful for charging the battery, even when an electrical outlet is available. However, alternate sources have not been employed to charge a battery in a portable electronic device. There is a need for an improved apparatus that charges a portable electronic device.

SUMMARY

An apparatus that charges a portable electronic device is disclosed. The apparatus can include a portable electronic device housing including a first aperture and at least one second aperture. The apparatus can include a battery coupled to the portable electronic device housing and a generator coupled to the battery, where the generator can be configured to charge the battery. The apparatus can include a rotatable turbine enclosed within the portable electronic device housing and coupled to the generator, where the rotatable turbine can be configured to drive the generator. The apparatus can include a conduit coupled to the rotatable turbine and coupled to the first aperture, where the conduit can be configured to provide fluid flow to drive the rotatable turbine.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting its scope, the disclosure will be described and explained with additional specificity and detail through the use of the accompanying drawings in which.

DETAILED DESCRIPTION

Figure 1:
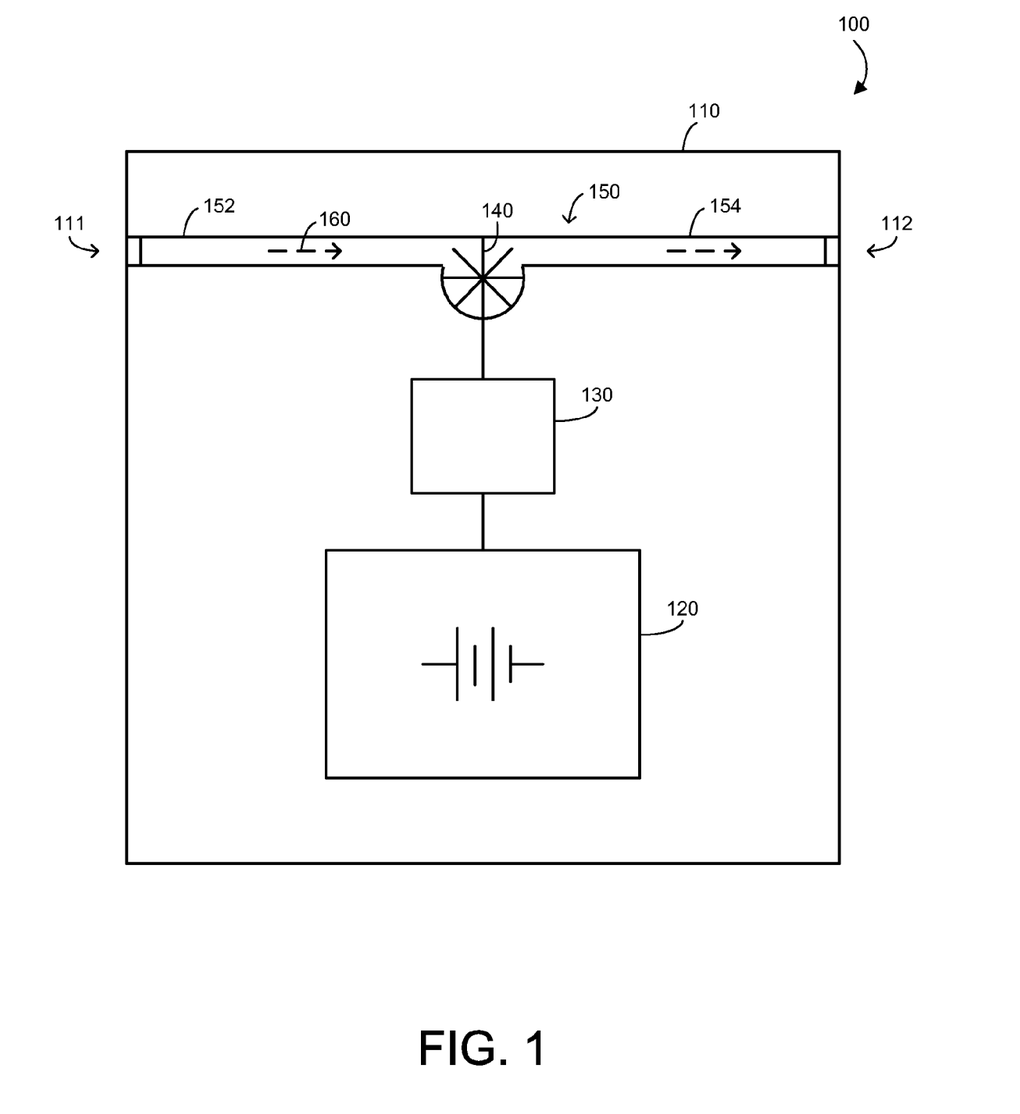
FIG. 1 is an exemplary block diagram of an apparatus according to a possible embodiment.

FIG. 1 is an exemplary block diagram of an apparatus 100 according to a possible embodiment. The apparatus 100 may be a wireless communication device, such as a wireless telephone, a cellular telephone, a personal digital assistant, a pager, a portable media player, a personal computer, a selective call receiver, or any other portable electronic device that can be easily carried by a user. The apparatus 100 can include a portable electronic device housing 110 including a first aperture 111 and at least one second aperture 112. The apertures 111 and 112 can provide openings in the portable electronic device housing 110. The first aperture 111 can be configured to be coupled to a source of pressurized fluid flow. The second aperture 112 can be a dedicated aperture, can be distributed throughout portions of the portable electronic device housing 110, can be multiple apertures, can be a Universal Serial Bus port, can be speaker openings, can be an earphone jack, or can be any other aperture.

The apparatus 100 can include a battery 120 coupled to the portable electronic device housing 110. As used herein, the term "battery" can include any portable power supply that can power a portable electronic device. The apparatus 100 can include a generator 130 coupled to the battery 120, where the generator 130 can be configured to charge the battery 120. The generator 130 may be any device that can be configured to generate a charge when coupled to a rotatable turbine for charging a battery, such as a direct current generator, an alternator combined with a rectifier, or any other device that can be coupled to a rotatable turbine to charge a battery. The apparatus 100 can include a rotatable turbine 140 enclosed within the portable electronic device housing 110 and coupled to the generator 130, where the rotatable turbine 140 can be configured to drive the generator 130. The apparatus 100 may be a battery apparatus, where the battery apparatus can include the portable electronic device housing 110, which can contain the battery cell 120, the rotatable turbine 140, the generator 130, a regulator, charging circuitry, and other elements. The battery apparatus can be charged on its own and without the need for other portable electronic device elements and can be coupled to another portable electronic device, such as after charging, to power the other portable electronic device.

The apparatus 100 can include a conduit 150 coupled to the rotatable turbine 140 and coupled to the first aperture 111, where the conduit 150 can be configured to provide fluid flow 160 to drive the rotatable turbine 140. The fluid flow 160 can include gas flow and/or liquid flow. Gas can include air, nitrogen, pressurized gas, wind, or any other gas. Liquid can include water, coolant, antifreeze, pressurized beverage, or any other liquid. The conduit 150 can be configured to keep fluid from reaching at least some electronic elements of the apparatus 100. For example, the conduit 150 can provide a sealed path for fluid to flow into the portable electronic device housing 110 via the first aperture 111, for the fluid to drive the rotatable turbine 140, and for the fluid to exit the portable electronic device housing 110 via the second aperture 112. As a further example, the conduit 150 can include an input conduit section 152 coupled to the rotatable turbine 140 and coupled to the first aperture 111, where the input conduit section 152 can be configured to provide fluid flow 160 to drive the rotatable turbine 140 and the conduit 150 can include an output conduit section 154 coupled to the rotatable turbine 140 and coupled to the second aperture 112. The output conduit section 154 can be configured to provide an output conduit for the fluid to exit the portable electronic device housing 110 via the second aperture 112. The output conduit section 154 can also be configured to reduce noise of fluid flow 160 exiting the output conduit section 154. For example, the output conduit section 154 can provide water, air, or other fluid flow noise suppression. To elaborate, exit ports, such as the output conduit section 154, the second aperture 112, multiple exit apertures, or external exit ports can be acoustically tuned to minimize pressurized fluid sound exiting the apparatus or cooling parts, such as by squelching hissing, high pitch sound, and other noises generated by fluid exiting an aperture.

The rotatable turbine 140 can include more than one turbine. The rotatable turbine 140 can be made of plastic, metal, composite, synthetic, any other material, or a combination of materials. The rotatable turbine 140 can include fans rotating parallel to a surface of the portable electronic device housing 110, can include fans rotating perpendicular to a surface of the portable electronic device housing 110, can include turbines at an angle within the portable electronic device housing 110, or can be any other rotatable turbine. With multiple turbines, each turbine can generate its own voltage and the voltage can be rectified and/or regulated. Also, the size of the conduit 150 and/or the size of the turbines 140 can vary to adjust an output voltage of each turbine 140. For example, the output voltage of a turbine 140 can be regulated and/or rectified electronically, can be regulated based on physical aspects of the rotatable turbine 140, the conduit 150, or other elements, or can be regulated both electronically and physically. Additionally, with multiple turbines, separate generators can be used for each turbine or groups of turbines or a single generator can be used for all of the multiple turbines. The separate generators can be placed in series and a single regulator can be placed at an output of the last generator or multiple regulators can be used to regulate the combination of generators. One or more regulators can be used with one or more generators to provide a consistent voltage to charge the battery 120.

Figure 2:
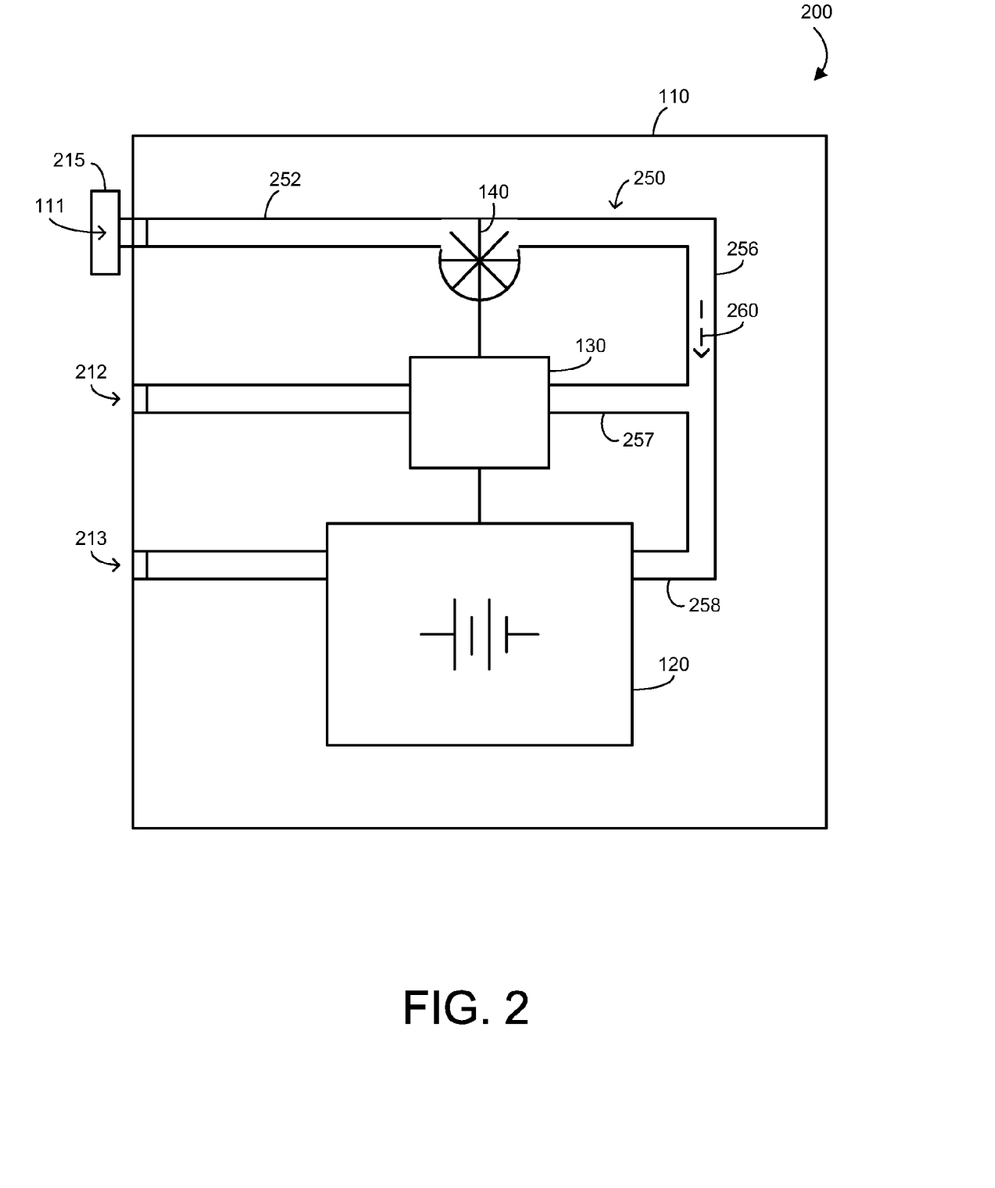
FIG. 2 is an exemplary illustration of an apparatus according to a possible embodiment.

FIG. 2 is an exemplary illustration of an apparatus 200 according to a related possible embodiment. Elements of the apparatus 200 can include, can be included with, or can be interchanged with elements of other embodiments and similar elements can include similar features and can perform similar functions. For example, the apparatus 200 can include elements of the apparatus 100. The apparatus 200 can also include an adjustment valve 215 coupled to the conduit 250. The adjustment valve 215 can be configured to control the amount of fluid flow into the conduit 250. The adjustment valve 215 can be coupled to an aperture, such as the first aperture 111, can be inside the portable electronic device housing 110, can be outside the portable electronic device housing 110, and/or can be detachably coupled to the conduit 250, the first aperture 111, or another aperture.

The apparatus 200 can further include a conduit 250 configured to provide fluid flow 260 to cool components of the apparatus 200. To elaborate, the conduit 250 can provide fluid flow to cool components 130 and 120 and other components of the apparatus 200 that heat up when the generator 130 charges the battery 120. For example, the generator 130 can include an electromotive generator and charging electronics. A conduit section 256 can provide fluid flow 260 to cool the generator 130, charging electronics, the battery 120, an electronic device power amplifier, and other components of the apparatus 200. As a further example, the conduit 250 can include a cooling conduit section 257 that can extend around the generator 130 charging electronics and other elements that generate heat. The conduit 250 can include an input conduit section 252 that can provide fluid flow to the cooling conduit section 257, which can channel the fluid flow around the generator 130 charging electronics and/or other elements to cool the elements. The cooling conduit section 257 may be part of the input conduit section 252, part of an output conduit section, or part of a conduit separate from the input conduit section 252 and an output conduit section.

The conduit 250 can include a plurality of cooling conduits configured to provide fluid flow to cool components of the apparatus 200. The plurality of cooling conduits can include a first cooling conduit section 257, a second cooling conduit section 258, and other cooling conduit sections. For example, the plurality of cooling conduits can include hollow channels, tunnels, or other conduits embedded within the portable electronic device housing 110, within a portable electronic device skin, or at other locations that can exit at different points to cool elements, components, and circuit parts of the apparatus 200. To elaborate, the cooling conduit sections 257 and 258 can exit a main conduit, such as the conduit section 256, at different points. The cooling conduit sections 257 and 258 can also exit the apparatus 200 at different points, such as at the second aperture 212 and at a third aperture 213, respectively, or the cooling conduit sections 257 and 258 can recombine and exit the apparatus 200 at a single aperture, such as at the second aperture 212. One or more cooling conduits may branch off from a main conduit or one or more cooling conduits may be part of one continuous conduit running from the first aperture 111 to at least one second aperture 212. Valves, switches, or other controls may be employed to selectively engage the cooling conduits 257 and 258. As a further example, air can exit the portable electronic device housing 110 at a certain point, such as the second aperture 212, to cool off a certain component at a specific location, such as on a circuit board or air can exit the portable electronic device housing 110 at different housing exit points, such as exit points including the third aperture 213, to cool off various other components, such as a power amplifier, a processor, and other components, located in different areas on a circuit board.

Figure 3:
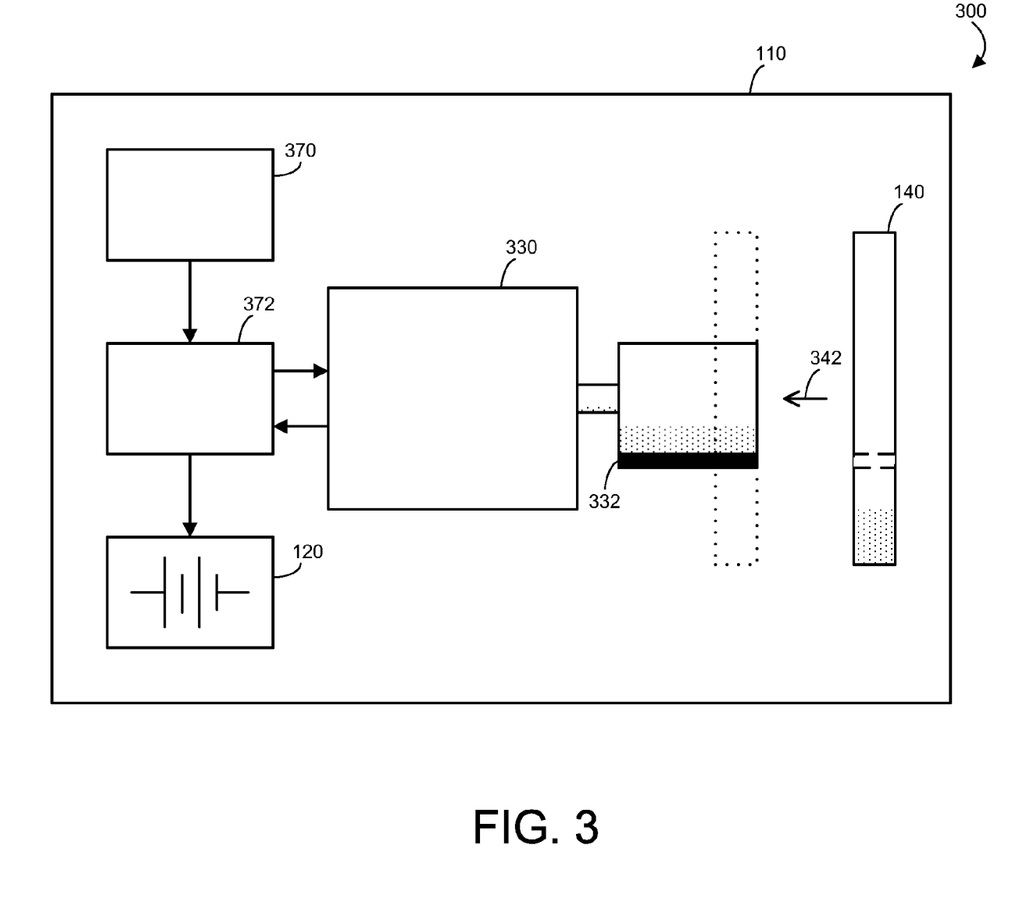
FIG. 3 is an exemplary illustration of an apparatus according to a possible embodiment.

FIG. 3 is an exemplary illustration of an apparatus 300 according to a related possible embodiment. Elements of the apparatus 300 can include, can be included with, or can be interchanged with elements of other embodiments and similar elements can include similar features and can perform similar functions. For example, the apparatus 300 can include elements of the apparatus 100. The apparatus 300 can also include a controller 370 and a switch 372. According to the present embodiment, a generator can be a portable electronic device vibrator 330. The rotatable turbine 140 can be detachably coupled 342 to the portable electronic device vibrator 330. The portable electronic device vibrator 330 can include an offset weight 332. The controller 370 can send a vibrate signal to the portable electronic device vibrator 330 that can spin the offset weight 332 in response to the vibrate signal and cause the apparatus 300 to vibrate. The switch 372 can be coupled to the portable electronic device vibrator 330, the controller 370, and the battery 120. The switch 372 can switch the portable electronic device vibrator 330 between a vibrate signal output of the controller 370 and a charging coupling coupled to the battery 120 to switch the portable electronic device vibrator 330 between a vibration function and a charging function.

Figure 4:
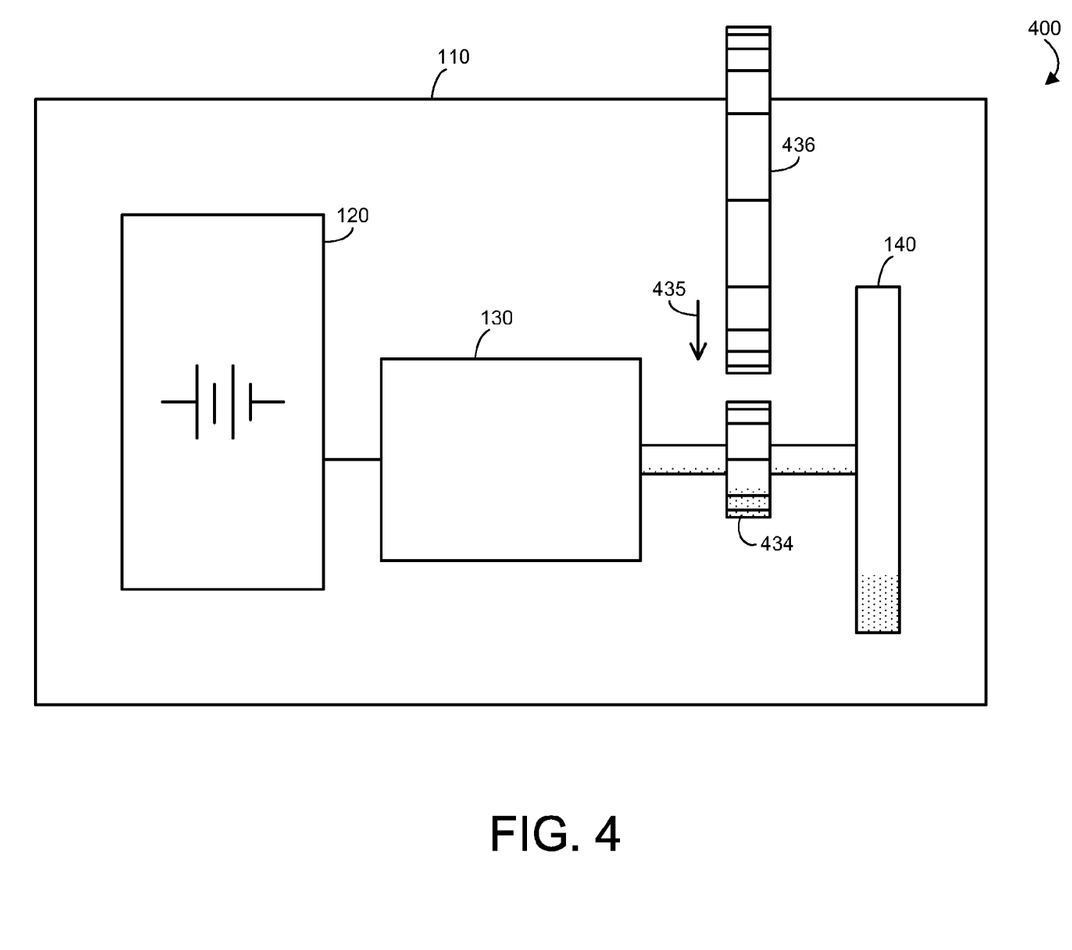
FIG. 4 is an exemplary illustration of an apparatus according to a possible embodiment.

FIG. 4 is an exemplary illustration of an apparatus 400 according to a related possible embodiment. Elements of the apparatus 400 can include, can be included with, or can be interchanged with elements of other embodiments and similar elements can include similar features and can perform similar functions. For example, the apparatus 400 can include elements of the apparatus 100. The apparatus 400 can include at least one gear 434 coupled to the generator 130 and a mechanical interface 436 at least partially external to the portable electronic device housing 110. The mechanical interface 436 can be configured to drive the gear 434 and the generator 130 to charge the battery 120. While the present embodiment shows a wheel-type mechanical interface, the mechanical interface 436 can also be a lever, a drill interface, or other mechanical interface at least partially external to the portable electronic device housing 110. For example, a user can turn a wheel or pump a lever to operate the generator 130. As another example, a drill interface can provide an interface for a cordless or corded drill to connect to the generator 130. A drill interface can include direct drill bit interface that can run through the center of the rotatable turbine 140 to turn the rotatable turbine 140 which can turn the gear 434 and drive the generator to charge the battery 120. The mechanical interface 436 can be detachably coupled 435 to the gear 434 and/or the gear 434 can be detachably coupled to the generator 130. The mechanical interface 436 can be configured to manually drive the gear 434 and/or the rotatable turbine 140 when the mechanical interface 436 is coupled to the gear 434 or when the gear 434 is coupled to the generator 130. The gear 434 can be located between the mechanical interface 436 and the generator 130 or between the mechanical interface 436 and the rotatable turbine 140. The rotatable turbine 140 can be detached from the generator 130 when the mechanical interface 436 is in use or can remain attached when the mechanical interface 436 is in use. The mechanical interface 436 can be used for manual or alternate emergency charging of the apparatus 400. For example, an external wheel can have access to or can be in contact with the rotatable turbine 140. The mechanical interface 436 can be geared to enable the rotatable turbine 140 or the generator 130 to operate at a faster or slower rate than when using the mechanical interface 436 without gears. For example, gears can increase the resulting rate of operation for manual operation of the mechanical interface 436 or decrease the rate of operation for drill bit operation of the mechanical interface 436.

Figure 5:
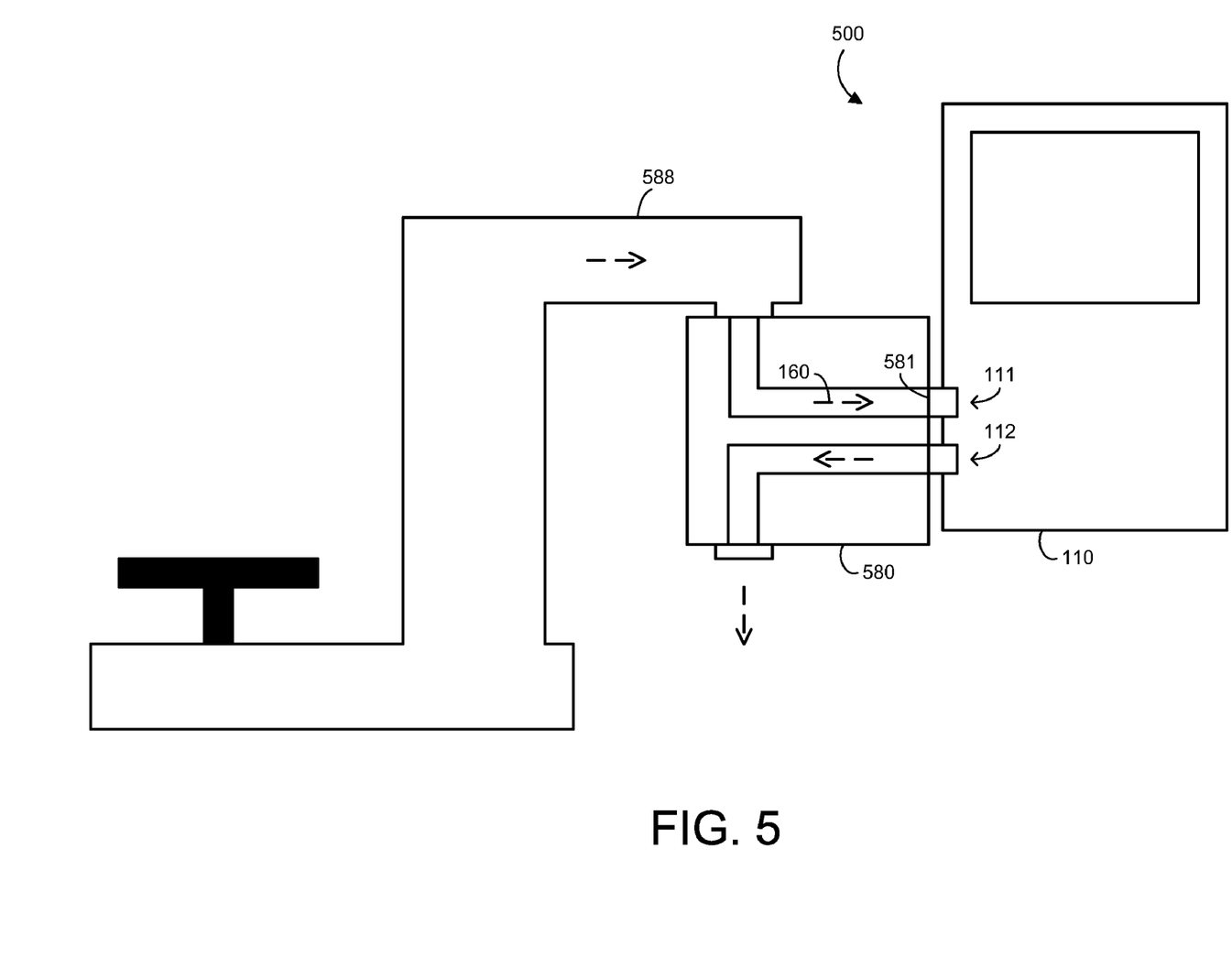
FIG. 5 is an exemplary illustration of an apparatus and a source of fluid flow according to a possible embodiment.

FIG. 5 is an exemplary illustration of an apparatus 500 and a source of fluid flow 588 according to a related possible embodiment. Elements of the apparatus 500 can include, can be included with, or can be interchanged with elements of other embodiments and similar elements can include similar features and can perform similar functions. For example, the apparatus 500 can include elements of the apparatus 100. The apparatus 500 can include an adapter 580 coupled to the first aperture 111. The adapter 580 can also be coupled to the second aperture 112. The adapter 580 can be configured to couple the first aperture 111 to a source 588 of fluid flow. The adapter 580 can also be configured to seal the first aperture 111 to the source 588 of fluid flow. The adapter 580 can be a detachably coupled to first aperture 111. The adapter 580 can include a fitting 581 coupled to the first aperture 111 and/or the second aperture 112. The fitting 581 can seal at least the first aperture 111 to a source 588 of fluid flow to maintain fluid flow pressure. The fitting 581 can provide a leak-proof connection between the first aperture 111 and the source 588 of fluid flow. For example, the fitting 581 can include a rubber gasket, can be a screw-on coupler, can be a snap-on connector, can be a connector that locks to a fluid flow source 588 output, can be a connector that uses a partial turn lock to connect to a fluid flow source 588 output, can be a magnetic connector, can be a tire valve connector, can be a connector for an air pump, or can be any other connector that can provide a connection between an aperture and a source of fluid flow. Hoses or other extensions can be used between the apertures 111 and 112 and the adapter 580 to keep the apparatus 500 at a distance from a source 588 of fluid flow or to allow the apparatus 500 to be placed at a different location, such as on a counter top, when the apparatus 500 is connected to a source 588 of fluid flow via the adapter 580. The adapter 580 can couple the first aperture 111 to a water faucet, as shown, or can couple the first aperture 111 to a compressor, a car tire nozzle, a hand pump, an interior car vent, a funneled nozzle, or any other source of fluid flow. For example, the apparatus 500 can provide a passive sealed compartment for water circulation and can charge every time a user uses water. The aperture 112 and/or exit elements of the adapter 580 can be designed to squelch noise of fluid exiting under pressure. Hoses or other elements of the adapter 580 can be tuned to minimize water or air noise.

Figure 6:
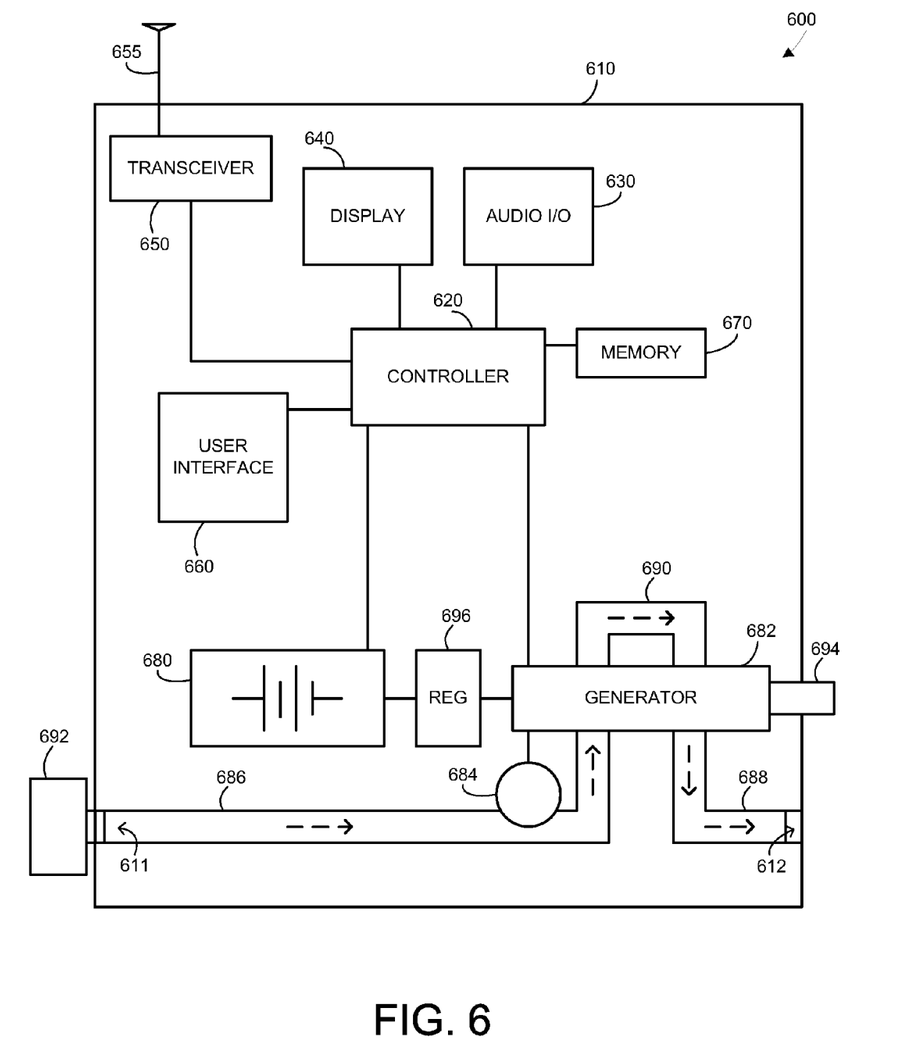
FIG. 6 is an exemplary block diagram of a portable electronic device according to a possible embodiment.

FIG. 6 is an exemplary block diagram of a portable electronic device 600, such as the apparatus 100, according to a possible embodiment. Elements of the portable electronic device 600 can include, can be included with, or can be interchanged with elements of other embodiments and similar elements can include similar features and can perform similar functions. The portable electronic device 600 can include a portable electronic device housing 610. The portable electronic device housing 610 can include a first aperture 611 and a second aperture 612. The portable electronic device 600 can include a controller 620 coupled to the housing 610. The controller 620 can be configured to control operations of the portable electronic device 600.

The portable electronic device 600 can include audio input and output circuitry 630 coupled to the housing 610 and coupled to the controller 620. The audio input and output circuitry 630 can include a microphone, a speaker, a transducer, or any other audio input and output circuitry. The portable electronic device 600 can include a display 640 coupled to the housing 610 and coupled to the controller 620. The display 640 can be a liquid crystal display (LCD), a light emitting diode (LED) display, a plasma display, or any other means for displaying information. The portable electronic device 600 can include a transceiver 650 coupled to the housing 610 and an antenna 655 coupled to the transceiver 650. The transceiver 650 may include a transmitter and/or a receiver. The portable electronic device 600 can include a user interface 660 coupled to the housing 610 and a memory 670 coupled to the housing 610. The user interface 660 can include a keypad, buttons, a touch pad, a joystick, an additional display, or any other device useful for providing an interface between a user and an electronic device. The memory 670 may include a random access memory, a read only memory, an optical memory, a subscriber identity module memory, or any other memory that can be coupled to a portable electronic device.

The portable electronic device 600 can also include a battery 680 coupled to the portable electronic device housing 610 and coupled to the controller 620. The battery 680 can be configured to provide power to elements of the portable electronic device 600. The portable electronic device 600 can include a regulator 696 coupled to the battery 680, where the regulator 696 can be configured to regulate charging voltage to the battery 680. The portable electronic device 600 can include a generator 682 coupled to the battery 680 via the regulator 696, where the generator 682 can be configured to charge the battery 680. The portable electronic device 600 can include a rotatable turbine 684 enclosed within the portable electronic device housing 610 and coupled to the generator 682. The rotatable turbine 684 can be configured to drive the generator 682 to charge the battery 680. The generator 682 can be a dedicated generator, a portable electronic device vibrator, or any other device coupled to the controller 620 and/or coupled to the battery 680 for generating a charge to charge a battery. For example, a portable electronic device vibrator can be configured to selectively charge the battery 680 and vibrate. The controller 620 can be configured to send a signal to such a portable electronic device vibrator to actuate vibration of the vibrator.

The portable electronic device 600 can include an input conduit section 686 within the portable electronic device housing 610, where the input conduit section 686 can be coupled to the rotatable turbine 684 and coupled to the first aperture 611. The input conduit section 686 can be configured to provide fluid flow in the portable electronic device housing 610 to drive the rotatable turbine 684. The portable electronic device 600 can include an output conduit section 688 coupled to the rotatable turbine 684 and coupled to the second aperture 612. The output conduit section 688 can be configured to output fluid flow from the portable electronic device housing 610. The input conduit section 686 and the output conduit section 688 can be configured to provide a sealed path for fluid flow to keep fluid flow in the portable electronic device 600 from reaching at least the battery 680 when the fluid flow drives the rotatable turbine 684.

The portable electronic device 600 can include cooling conduit 690 coupled to the generator 682. The input conduit section 686 can provide fluid flow to the cooling conduit 690 to cool the generator 682 when the fluid flow drives the rotatable turbine 684 and the generator 682 charges the battery 680. The cooling conduit 690 can also be coupled to other elements of the portable electronic device 600 to cool the other elements.

The portable electronic device 600 can include an adapter 692 coupled to the first aperture 611 and the input conduit section 686. The adapter 692 can be configured to seal the first aperture 611 to a source of fluid flow. The adapter 692 can be integral in the portable electronic device 100 or can be detachably coupled to the first aperture 611. The adapter 692 can include an adjustment valve coupled to the input conduit section 686. The adjustment valve can be configured to control the amount of fluid flow into the input conduit section 686. The portable electronic device 600 can include a mechanical interface 694 coupled to the generator 682 and at least partially external to the portable electronic device housing 610. The mechanical interface 694 can be configured to drive the generator 682 to charge the battery 680.

Figure 7:
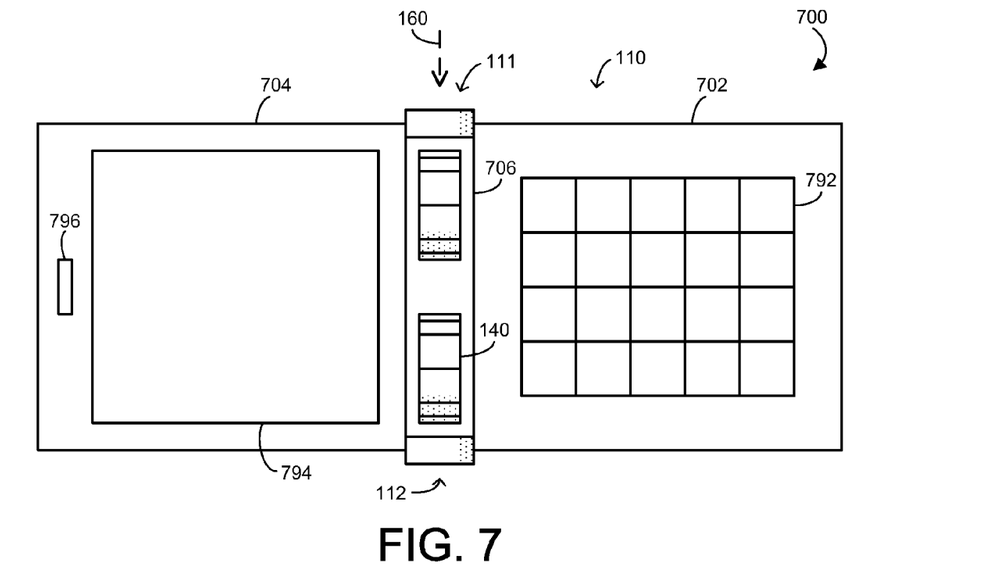
FIG. 7 is an exemplary illustration of an apparatus according to a possible embodiment.

FIG. 7 is an exemplary illustration of an apparatus 700 according to a related possible embodiment. Elements of the apparatus 700 can include, can be included with, or can be interchanged with elements of other embodiments and similar elements can include similar features and can perform similar functions. For example, the apparatus 700 can include elements of the apparatus 100, such as the portable electronic device housing 110. The portable electronic device housing 110 can be a flip or clam-style housing. For example, the portable electronic device housing 110 can include a first housing 702 and a second housing 704. The first housing 702 can be coupled to the second housing 704 via a hinge 706. The first housing 702 can include a user interface 792. The second housing 704 can include a display 794 and/or an audio output 796. The audio output 796 can be a speaker, a headset jack, or any other element that can output audio from a portable electronic device. The hinge 706 can include the first aperture 111 and the second aperture 112. The hinge 706, the first housing 702, or the second housing 704 can include at least one rotatable turbine 140. The hinge 706 can provide a conduit for fluid flow 160 to drive the at least one rotatable turbine 140.

Figure 8:
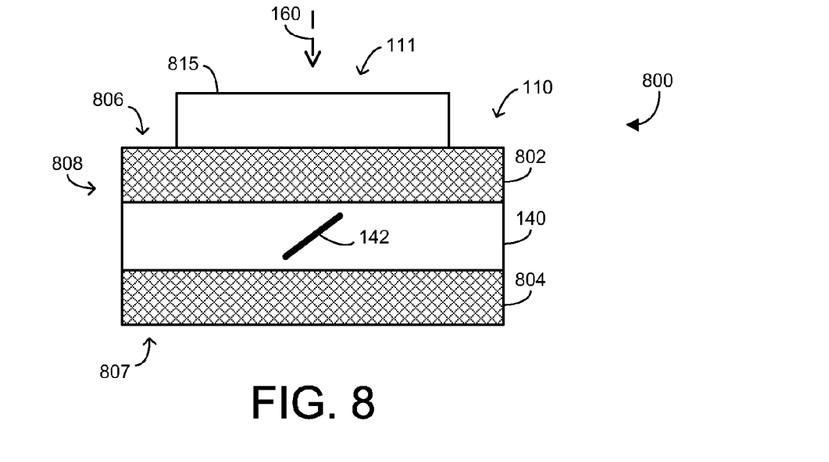
FIG. 8 is an exemplary partial cut away view of an apparatus according to a possible embodiment.

FIG. 8 is an exemplary partial cut away view of an apparatus 800 according to a related possible embodiment. Elements of the apparatus 800 can include, can be included with, or can be interchanged with elements of other embodiments and similar elements can include similar features and can perform similar functions. For example, the apparatus 800 can include elements of the apparatus 100. The apparatus 800 can include a portable electronic device housing 110 having first housing section 802, a second housing section 804, and at least one housing side 808. The first housing section 802 can have a first housing face 806 and the second housing section 804 can have a second housing face 807. The portable electronic device housing 110 can include a rotatable turbine 140 between the first housing section 802 and the second housing section 804. The first housing face 806 can have a first aperture 111 configured to provide fluid flow to the rotatable turbine 140. The first aperture 111 can be coupled to an adaptor 815, such as a hose or an inlet. The rotatable turbine 140 can include at least one blade 142. The blade 142 can be tilted at an angle non-parallel and non-perpendicular to the first housing face 806 to allow fluid flow 160 perpendicular to the first housing face 806 to turn the rotatable turbine 140 in a rotational motion parallel to the first housing face 806. The fluid flow 160 may exit the portable electronic device housing 110 through an aperture in the second housing face 807, may exit the portable electronic device housing 110 through an aperture the housing side 808, or may be redirected to exit the portable electronic device housing 110 at another location or aperture in the first housing face 806.

Figure 9:
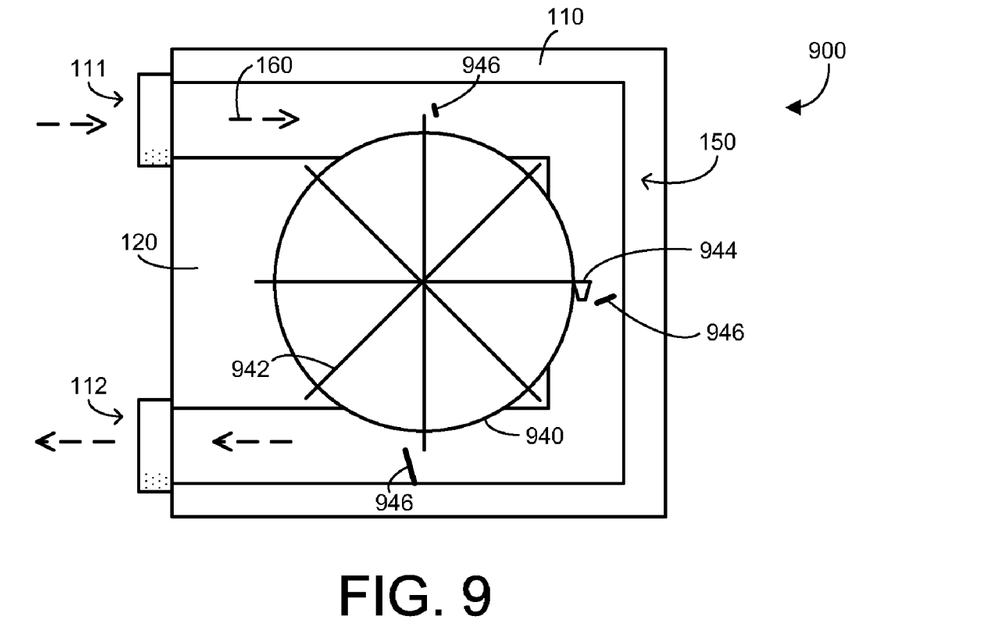
FIG. 9 is an exemplary illustration of a section of an apparatus according to a possible embodiment.

FIG. 9 is an exemplary illustration of a section of an apparatus 900 according to a related possible embodiment. Elements of the apparatus 900 can include, can be included with, or can be interchanged with elements of other embodiments and similar elements can include similar features and can perform similar functions. For example, the apparatus 900 can include elements of the apparatus 100. The apparatus 900 can include a rotatable turbine 940 with a low height going into the illustration relative to a thickness of the portable electronic device housing 110 going into the illustration. The rotatable turbine 940 can be located on top of the battery 120. The rotatable turbine 940 may be a single rotatable turbine with a relatively large diameter relative to a face or a width of the portable electronic device housing 110 going across the plane of the illustration. For example, turbine blade 942 surface area lost due to the thinness of the rotatable turbine 940 into the illustration can compensated for by the length of turbine blades 942 due to the large diameter. The blades 942 can include nozzles 944 (only one shown) to assist in driving the rotatable turbine 940. Blocking walls 946 can act a as collectors to help guide portions of fluid flow into each nozzle 944. Differing blocking wall lengths can be used to guide equal amounts of fluid into each nozzle 944 and/or to control fluid flow pressure or velocity at various locations or throughout the conduit 150.

Figure 10:
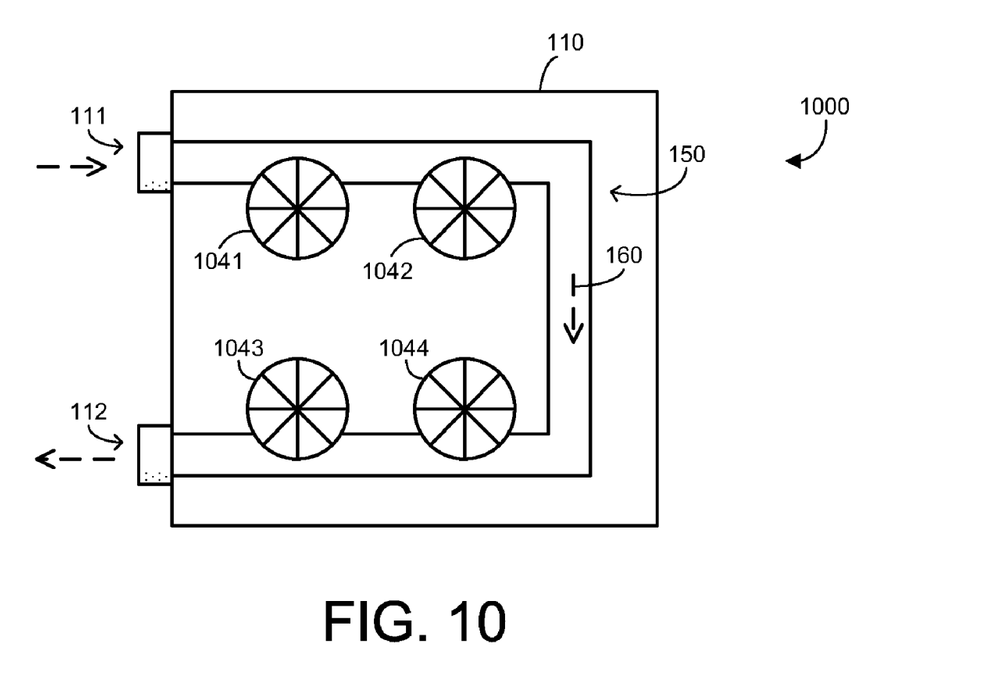
FIG. 10 is an exemplary illustration of a section of an apparatus according to a possible embodiment.

FIG. 10 is an exemplary illustration of a section of an apparatus 1000 according to a related possible embodiment. Elements of the apparatus 1000 can include, can be included with, or can be interchanged with elements of other embodiments and similar elements can include similar features and can perform similar functions. For example, the apparatus 1000 can include elements of the apparatus 100. The apparatus 1000 can include a plurality of rotatable turbines 1041-1044 coupled to the conduit 150 and enclosed within the portable electronic device housing 110. The first aperture 111 can provide fluid flow 160 through the conduit 150 and out the second aperture 112 to drive the plurality of rotatable turbines 1041-1044.

Figure 11:
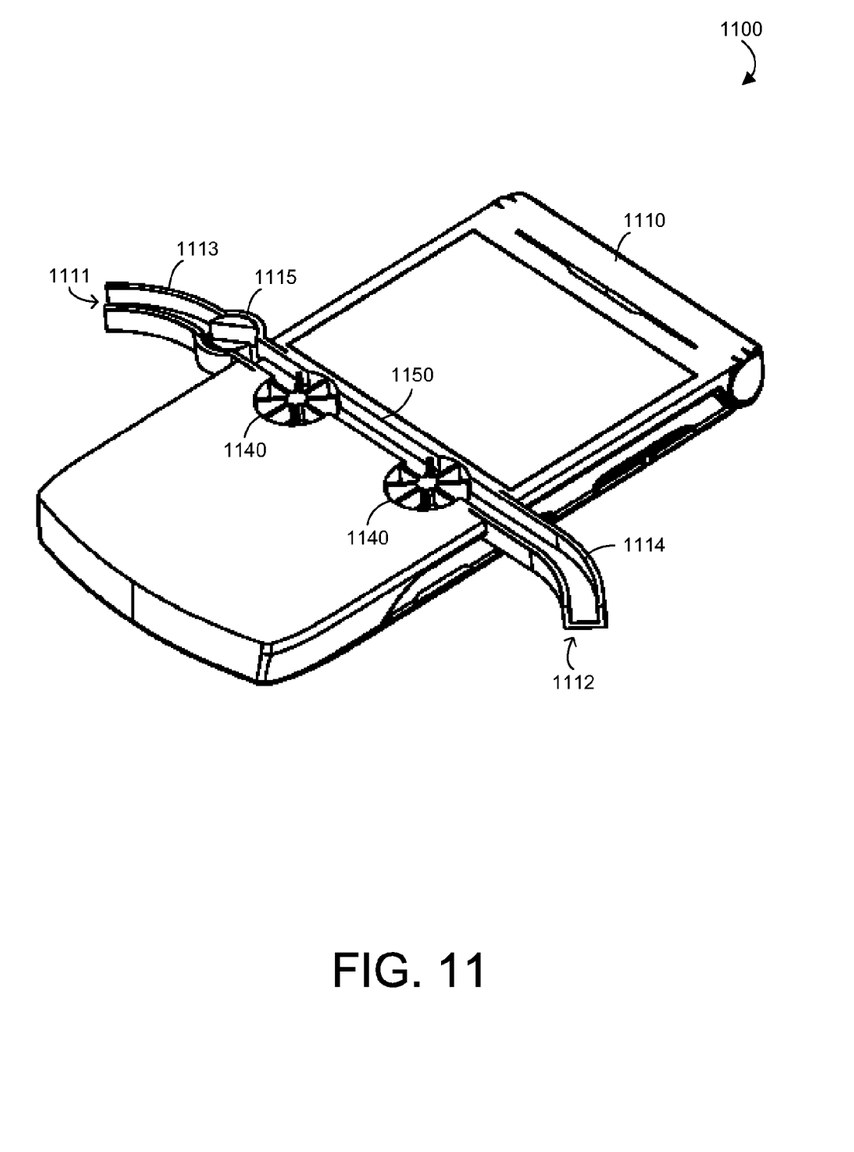
FIG. 11 is an exemplary illustration of an apparatus according to a possible embodiment.

FIG. 11 is an exemplary illustration of a cut away isometric view of an apparatus 1100 according to a related possible embodiment. Elements of the apparatus 1100 can include, can be included with, or can be interchanged with elements of other embodiments and similar elements can include similar features and can perform similar functions. For example, the apparatus 1100 can include elements of the apparatus 100. The apparatus 1100 can include a portable electronic device housing 1110 including a first aperture 1111 and at least one second aperture 1112. The apertures 1111 and 1112 can provide openings in the portable electronic device housing 1110. The apertures 1111 and 1112 can be flush with the portable electronic device housing 1110, can be recessed into the portable electronic device housing 1110, or can be extended from the portable electronic device housing 1110. For example, extensions 1113 and 1114 can extend an entry location from the portable electronic device housing 1110 for fluid flow into the apertures 1111 and 1112. The apparatus 1100 can include an adjustment valve 1115 coupled to the conduit 1150. The adjustment valve 1115 can be configured to control the amount of fluid flow into the conduit 1150. The adjustment valve 1115 can be coupled to an aperture, such as the first aperture 1111, can be inside the portable electronic device housing 1110, can be outside the portable electronic device housing 1110, and/or can be detachably coupled to the conduit 1150, the first aperture 1111, or another aperture.

The apparatus 1100 can include at least one rotatable turbine 1140 enclosed within the portable electronic device housing 1110. The apparatus 1100 can include a conduit 1150 coupled to the at least one rotatable turbine 1140 and coupled to the first aperture 1111, where the conduit 1150 can be configured to provide fluid flow to drive the rotatable turbine 1140. The conduit 1150 can be configured to keep fluid from reaching at least some electronic elements of the apparatus 1100. For example, the conduit 1150 can provide a sealed path for fluid to flow into the portable electronic device housing 1110 via the first aperture 1111, for the fluid to drive the at least one rotatable turbine 1140, and for the fluid to exit the portable electronic device housing 1110 via the second aperture 1112.

Embodiments can provide for charging an apparatus using a pressurized water source, a compressed air source, a forced air source, or other source of fluid flow. An apparatus can use a turbine that rotates under the pressure of pressurized water, compressed air, forced air, or other fluid flow. The turbine can be located in the apparatus, integrated with a battery, integrated with other elements, or located elsewhere in a housing. A sealed intake valve and output valve can couple the apparatus to water or air from a source. A tube end can mate with the valve. The tube end can have a turning wheel or valve to control air or water flow and speed which can regulate charging and cooling rates. A hose system can also be tuned for water and air noise cancellation.

Water and air can be good coolants for battery charging. Pressurized water is readily available in homes and at other locations. Compressed or pressurized air is also readily available, such as in cars, either actively via car vents or tire valves or passively via a funnel. Other sources can include shops, hair dryers, vacuums, and other sources. These sources can be used for battery charging by turning a turbine while cooling elements of an apparatus.

The turbine can be an integral part of a battery or of a portable electronic device housing. A turbine fan can rotate under the pressure of car wind funneled in from outside to inside via a nozzle or window, from pressurized house water source, such as from a faucet, via compressed air from a car tire or compressor, or from any other source of pressurized fluid flow.

Simulation results show that good charging rates can be achieved from various fluid flow sources. For example, using a turbine diameter of 10 mm, 40 PSI water pressure, such as that available inside homes can achieve a charging rate of about 51 W corresponding to a 12.75 AH at 4V. As another example, 41 PSIG air pressure can achieve a charging rate of 899 W, which can be higher than the water rate because air is compressible. Other charging rates can be achieve depending on the source of fluid flow, depending on the pressure of fluid flow, depending on design of elements such as turbine size, and depending on other elements, such as gears, generators, regulators, and other elements.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An apparatus comprising:
a portable electronic device housing including a first aperture and at least one second aperture;
a battery coupled to the portable electronic device housing;
a controller coupled to the battery, the controller configured to control operations of the portable electronic device;
a transceiver coupled to the controller;
a generator coupled to the battery, the generator configured to charge the battery;
a rotatable turbine enclosed within the portable electronic device housing and coupled to the generator, the rotatable turbine configured to drive the generator; and
a conduit coupled to the rotatable turbine within the portable electronic device housing and coupled to the first aperture, the conduit configured to provide fluid flow to drive the rotatable turbine,
wherein the first aperture comprises a first aperture width perpendicular to a direction of fluid flow, and
wherein the conduit comprises a conduit length and a conduit width, where the conduit length is parallel to the direction of fluid flow, where the conduit width is perpendicular to the conduit length, where the conduit width is parallel to the aperture width, and where the conduit length is greater than the conduit width.

2. The apparatus according to claim 1, wherein the conduit comprises:
an input conduit section coupled to the rotatable turbine and coupled to the first aperture, the input conduit section configured to provide fluid flow to drive the rotatable turbine; and
an output conduit section coupled to the rotatable turbine and coupled to the second aperture.

3. The apparatus according to claim 1, wherein the fluid flow comprises one selected from the group of gas flow and liquid flow.

4. The apparatus according to claim 1, wherein the conduit is configured to provide fluid flow to cool components of the apparatus.

5. The apparatus according to claim 4, wherein the conduit includes a plurality of cooling conduits configured to provide fluid flow to cool components of the apparatus.

6. The apparatus according to claim 1,
wherein the generator comprises a portable electronic device vibrator, and
wherein the rotatable turbine is detachably coupled to the portable electronic device vibrator.

7. The apparatus according to claim 1, further comprising:
a gear coupled to the generator; and
a mechanical interface at least partially external to the portable electronic device housing, the mechanical interface configured to drive the gear and the generator.

8. The apparatus according to claim 1, wherein the first aperture is configured to be coupled to a source of pressurized fluid flow.

9. The apparatus according to claim 1, further comprising an adapter coupled to the first aperture, the adapter configured to couple the first aperture to a source of fluid flow.

10. The apparatus according to claim 1, wherein the rotatable turbine comprises a plurality of rotatable turbines enclosed within the portable electronic device housing.

11. The apparatus according to claim 1, further comprising an adjustment valve coupled to the conduit, the adjustment valve configured to control the amount of fluid flow into the conduit.

12. The apparatus according to claim 1, wherein the conduit includes an output conduit section configured to reduce noise of fluid flow exiting the output conduit section.

13. A portable electronic device comprising:
a portable electronic device housing including a first aperture and a second aperture;
a controller coupled to the portable electronic device housing, the controller configured to control operations of the portable electronic device;
a display coupled to portable electronic device housing and coupled to the controller;
audio output circuitry coupled to the portable electronic device housing and coupled to the controller;
a battery coupled to the portable electronic device housing and coupled to the controller, the battery configured to provide power to the portable electronic device;
a regulator coupled to the battery, the regulator configured to regulate charging voltage to the battery;
a generator coupled to the battery via the regulator, the generator configured to charge the battery;
a rotatable turbine enclosed within the portable electronic device housing and coupled to the generator, the rotatable turbine configured to drive the generator to charge the battery;
an input conduit section within the portable electronic device housing, the input conduit section coupled to the rotatable turbine and coupled to the first aperture, the input conduit section configured to provide fluid flow in the portable electronic device housing to drive the rotatable turbine; and
an output conduit section coupled to the rotatable turbine and coupled to the second aperture, the output conduit section configured to output fluid flow from the portable electronic device housing,
wherein the first aperture comprises a first aperture width perpendicular to a direction of fluid flow,
wherein the input conduit section comprises an input conduit section length and an input conduit section width, where the input conduit width is parallel to the first aperture width,
wherein the output conduit section comprises an output conduit section length,
wherein a combination of the input conduit section length and the output conduit section length comprises a conduit length, where the conduit length is parallel to the direction of fluid flow, where the input conduit width is perpendicular to the conduit length, and where the conduit length is greater than the input conduit width.

14. The portable electronic device according to claim 13, further comprising a cooling conduit coupled to the generator,
wherein the input conduit section is configured to provide fluid flow to the cooling conduit to cool the generator when the fluid flow drives the rotatable turbine and the generator charges the battery.

15. The portable electronic device according to claim 13, further comprising an adapter coupled to the first aperture, the adapter configured to seal the first aperture to a source of fluid flow.

16. The portable electronic device according to claim 13, wherein the input conduit section and the output conduit section are configured to provide a sealed path for fluid flow to keep fluid flow in the portable electronic device from reaching at least the battery when the fluid flow drives the rotatable turbine.

17. The portable electronic device according to claim 13, further comprising an adjustment valve coupled to the input conduit section, the adjustment valve configured to control the amount of fluid flow into the input conduit section.

18. The portable electronic device according to claim 13,
wherein the generator comprises a portable electronic device vibrator coupled to the controller and coupled to the battery, the portable electronic device vibrator configured to selectively charge the battery and vibrate, and
wherein the controller is configured to send a signal to the portable electronic device vibrator to actuate vibration of the vibrator.

19. An apparatus comprising:
a portable electronic device housing including a first aperture and at least one second aperture, the first aperture configured to be coupled to a source of fluid flow;
a battery coupled to the portable electronic device housing;
a generator coupled to the battery, the generator configured to charge the battery;
a rotatable turbine enclosed within the portable electronic device housing and coupled to the generator, the rotatable turbine configured to drive the generator; and
a conduit coupled to the rotatable turbine within the portable electronic device housing and coupled to the first aperture, the conduit configured to provide fluid flow to drive the rotatable turbine and the conduit configured to provide fluid flow to cool the generator,
wherein the first aperture comprises a first aperture width perpendicular to a direction of fluid flow, and
wherein the conduit comprises a conduit length and a conduit width, where the conduit length is parallel to the direction of fluid flow, where the conduit width is perpendicular to the conduit length, where the conduit width is parallel to the aperture width, and where the conduit length is greater than the conduit width.

20. The apparatus according to claim 19, further comprising an adapter coupled to the first aperture, the adapter configured to seal the first aperture to a source of fluid flow.

* * * * *